(12) United States Patent
Sigal et al.

(10) Patent No.: US 6,182,286 B1
(45) Date of Patent: Jan. 30, 2001

(54) DYNAMIC VERSIONING SYSTEM FOR MULTIPLE USERS OF MULTI-MODULE SOFTWARE SYSTEMS

(75) Inventors: Andrew David Sigal, Seattle; Daniel Bien, Redmond, both of WA (US); Augusto Pissarra, Curitiba (BR)

(73) Assignee: Microsoft Corporation, Redmond, WA (US)

( * ) Notice: Under 35 U.S.C. 154(b), the term of this patent shall be extended for 0 days.

(21) Appl. No.: 09/222,243

(22) Filed: Dec. 28, 1998

Related U.S. Application Data

(63) Continuation of application No. 08/719,687, filed on Sep. 26, 1996, now Pat. No. 5,881,292.

(51) Int. Cl.[7] .................................................. G06F 9/445
(52) U.S. Cl. ............................................................. 717/11
(58) Field of Search ............................ 395/712; 707/203, 707/200, 201, 202, 204

(56) References Cited

U.S. PATENT DOCUMENTS

| | | |
|---|---|---|
| 4,459,655 | 7/1984 | Willemin . |
| 4,558,413 * | 12/1985 | Schmidt et al. ...................... 707/203 |
| 4,714,992 * | 12/1987 | Gladney et al. ..................... 707/2.03 |
| 4,714,996 * | 12/1987 | Gladney et al. ...................... 707/203 |
| 4,853,843 | 8/1989 | Ecklund . |
| 4,875,159 * | 10/1989 | Cary et al. ............................ 707/203 |
| 4,912,637 * | 3/1990 | Sheedy et al. ......................... 707/203 |
| 5,438,661 * | 8/1995 | Ogawa ................................. 345/346 |
| 5,499,365 * | 3/1996 | Anderson et al. ................... 707/203 |
| 5,574,898 * | 11/1996 | Leblang et al. ........................... 707/1 |
| 5,603,027 | 2/1997 | Ohkami . |
| 5,649,200 * | 7/1997 | Leblang et al. .......................... 717/3 |
| 5,732,275 | 3/1998 | Kullick . |
| 5,802,368 * | 9/1998 | Grigsby et al. ....................... 709/305 |
| 5,806,078 * | 9/1998 | Hug et al. ............................. 707/511 |
| 5,974,470 * | 10/1999 | Hammond ............................ 709/305 |

OTHER PUBLICATIONS

Title: An Object Oriented Model of Software Configuration Management, Author: Render et al, source : ACM, 1991.*
Title: Version Management in Gypsy, Author: Cohen, source: ACM, 1988.*
Title: A Unified version model for conjuration management, author: Zeller, ACM, 1995.*
Title: The shared region approach to software cache coherence on multiprocessor, author: Sandhu et al, ACM, 1993.*
Title: intersolv and Segue software deliver integrated testing and version management system ; Joint solution available immediately to provide configuration management of automated tests. Source : Business Wire, Jun. 12, 1996.*

* cited by examiner

Primary Examiner—Tariq R. Hafiz
Assistant Examiner—Chameli Chaudhuri Das
(74) Attorney, Agent, or Firm—Kilpatrick Stockton LLP

(57) ABSTRACT

A dynamic versioning system for synchronizing different versions of modules among different versions of a complex multi-module software system, and maintaining a consistent view of a version of the complex system for each user having access to the system. The dynamic versioning system grants a user read-only access to the multiple modules in a complex system, and promotes the access to write access only when a user is ready to save a modified module in the permanent non-volatile memory of the complex system. The dynamic versioning system manages the evolving versions of the complex system with a Dynamic Versioning Table (DVT) and master modules that identify the multiple slave modules associated with a particular version of the complex system. Old versions of modules are removed from the complex system's permanent non-volatile memory when the last user has terminated use of the complex system.

26 Claims, 11 Drawing Sheets

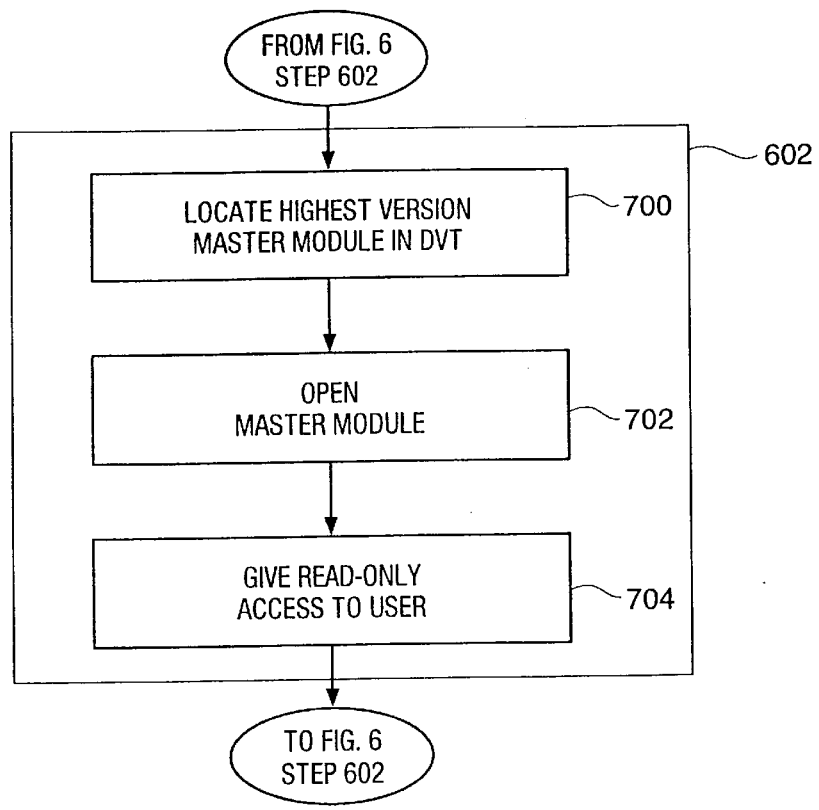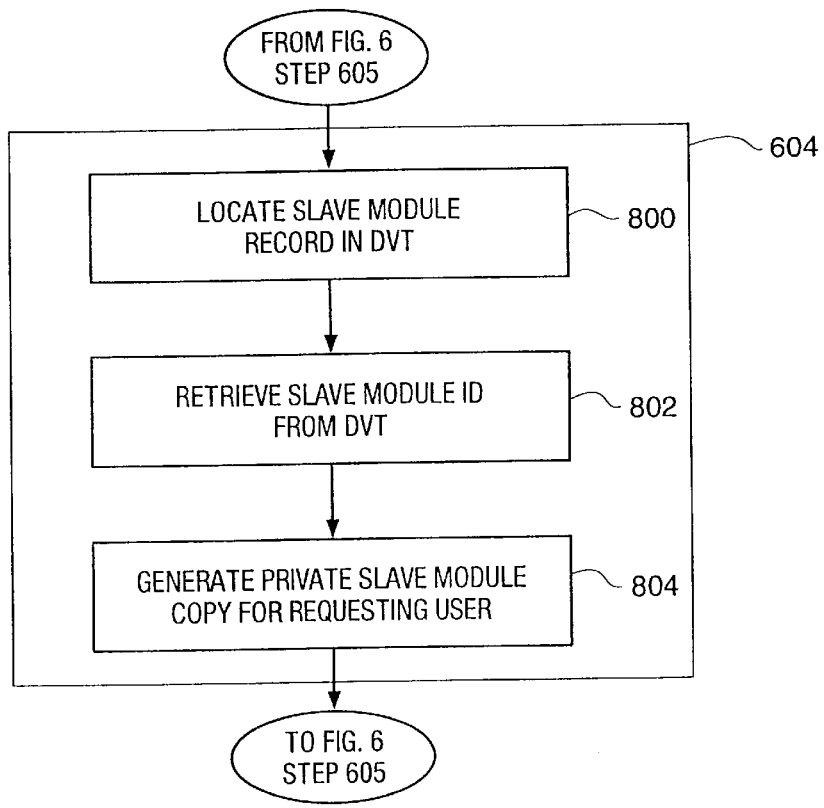

DYNAMIC VERSIONING SYSTEM FOR MULTIPLE USERS OF MULTI-MODULE SOFTWARE SYSTEMS

RELATED CASES

This application is a continuation of application Ser. No. 08/719,687, entitled "DYNAMIC VERSIONING SYSTEM FOR MULTIPLE USERS OF MULTI-MODULE SOFTWARE SYSTEMS" filed on Sep. 26, 1996 now U.S. Pat. No. 5,881,292, and that is hereby incorporated by reference into this application.

FIELD OF THE INVENTION

The present invention relates to managing multi-module software systems, and in particular to synchronizing different versions of a multiple module software system among multiple users and maintaining a consistent view of a given version of the software system for each user having access to the software system.

PROBLEM

Multi-module software systems, also known as complex software objects, multi-module objects or complex systems, include but are not limited to computer programs, databases, and text documents. A multi-module software system is typically subdivided into a plurality of modules, also known as components or subcomponents, to facilitate developing, maintaining, and/or modifying the system by multiple users. For example, where multiple users are involved in developing, maintaining, and/or modifying a database, a first user can modify a first record source in the database without impacting or having knowledge of a second user who is modifying a second record source in the same database. Similarly, depending on the modular architecture of a text document, a first user can be modifying a first chapter or section without impacting or having knowledge of a second user who is modifying a second chapter or section.

In addition to the convenience of modularity, certain multi-module software systems require that each user of the system have a synchronized view of the system. For example, each user of a database may be allowed to serially modify individual modules of the database although each modification is synchronized within the database to maintain for proper operation of the database application as a whole. Similarly, multiple users may be allowed to manipulate individual modules of a document although printing the document requires that the modifications be integrated into the whole.

One problem with having multiple users developing, maintaining, and/or modifying individual modules of a multi-module system is maintaining a consistent updated master copy of the system. For example, a first user may modify module "A" which relates in some manner to module "B", while a second user may modify module "B" in a manner inconsistent with the first user's modification to module "A." One solution to the above problem is to restrict the number of users who may simultaneously access individual modules of the object for purposes of modification. For example, any number of users may simultaneously access an object for read purposes although only one user at a time may access an object for write purposes. This solution is undesirable because it imposes a restriction on the use of an object in that all design and/or maintenance changes must be performed serially to assure exclusivity for each user writing to a module.

Another solution is to provide each user with read and write access to a private copy of the entire multi-module system. However, this solution is undesirable because it is memory intensive and requires significant amounts of processing time to re-synchronize the multiple copies of the modified system back into a single master copy.

For the reasons stated above, a need exists for an improved method of generating and maintaining versions of a complex software system having a plurality of modules for each of multiple users of the complex software system.

SOLUTION

The above and other problems are solved by the dynamic versioning system of the present invention. The dynamic versioning system includes opening a master module in response to a user request to access a complex system, generating a read-only copy of the most recent version of slave modules known to the master module, and promoting the read-only status of a slave module to read-write only in response to a user request to save a slave module. The system further includes saving the read-write copy of a slave module in permanent non-volatile memory for the complex system in response to the step of promoting, while other users having read-only access to a shared copy of the original slave module continue reading their now outdated slave module version. Read-only users continue with their now outdated slave module version because the now outdated slave module version is consistent with the complex system known to them.

The dynamic versioning system further includes generating and updating a Dynamic Versioning Table (DVT) to track master module and slave module versions. The DVT includes a record or row of version identification and location information for each master module version of the complex system, and a record or row of version identification and location information for each version of slave module associated with a master module. The version identification and location information in each DVT record includes the module name and a unique version number derived from a monotonically increasing alphabetic or numeric series.

Saving a read-write copy of a modified slave module includes generating a copy of the modified slave module, recording a new module version identifier in the DVT for the copy of the modified slave module, updating the master module to reflect the new slave module version, and assigning a new version identifier to the DVT record for the master module to indicate a new generation or version of the software system.

The dynamic versioning system further includes a cleanup process that eliminates unused old copies of slave modules from the complex system after the last user of the complex system terminates use of the complex system.

BRIEF DESCRIPTION OF THE DRAWINGS

FIG. 7 illustrates an overview of operational steps in flow diagram form for opening a master module;

FIG. 8 illustrates an overview of operational steps in flow diagram form for opening a slave module;

DETAILED DESCRIPTION

Figure 1:
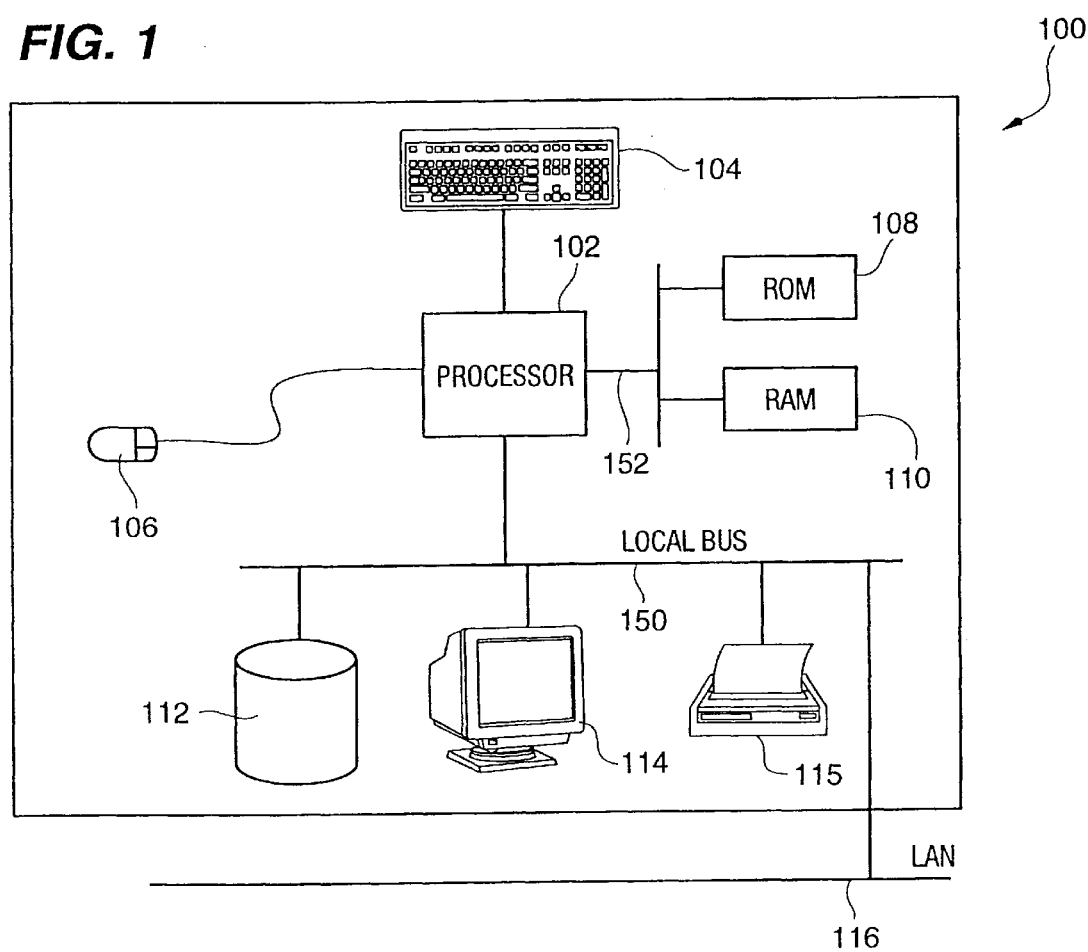
FIG. 1 illustrates a dynamic versioning system computing environment example in block diagram form.

Computing Environment Example—FIG. 1

FIG. 1 illustrates a block diagram example of a computer system 100 useable by the dynamic versioning system. The dynamic versioning system is operable in any of several standard computing systems generally available in the industry. Programmed instructions for the dynamic versioning system are executable on processor 102. Processor 102 stores and/or retrieves programmed instructions and/or data from memory devices that include, but are not limited to, Read Only Memory (ROM) 108 and Random Access Memory (RAM) 110 by way of memory bus 152. Another accessible memory device includes non-volatile memory device 112 by way of local bus 150. User input to computer system 100 can be entered by way of keyboard 104 and/or pointing device 106. Human readable output from computer system 100 can be viewed on display 114 or in printed form on local printer 115. Alternatively, computer system 100 is accessible from and has access to remote facilities by way of Local Area Network (LAN) 116 in a manner well known in distributed computing and the computer network arts.

Figure 2:
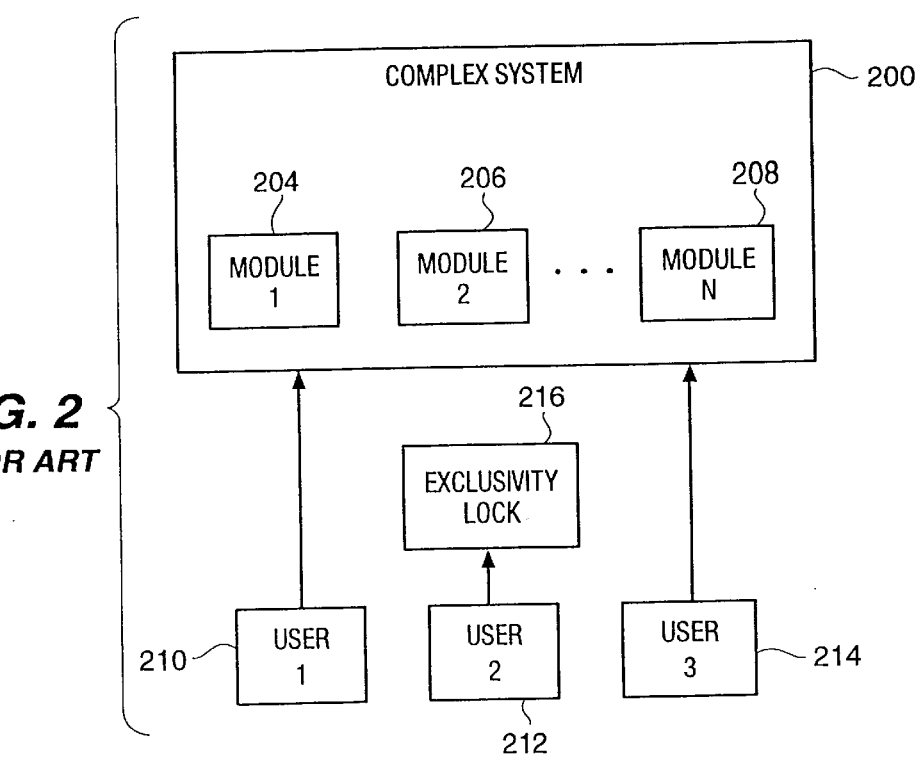
FIGS. 2–4 illustrate existing techniques in block diagram form for managing complex software systems.
Figure 3:
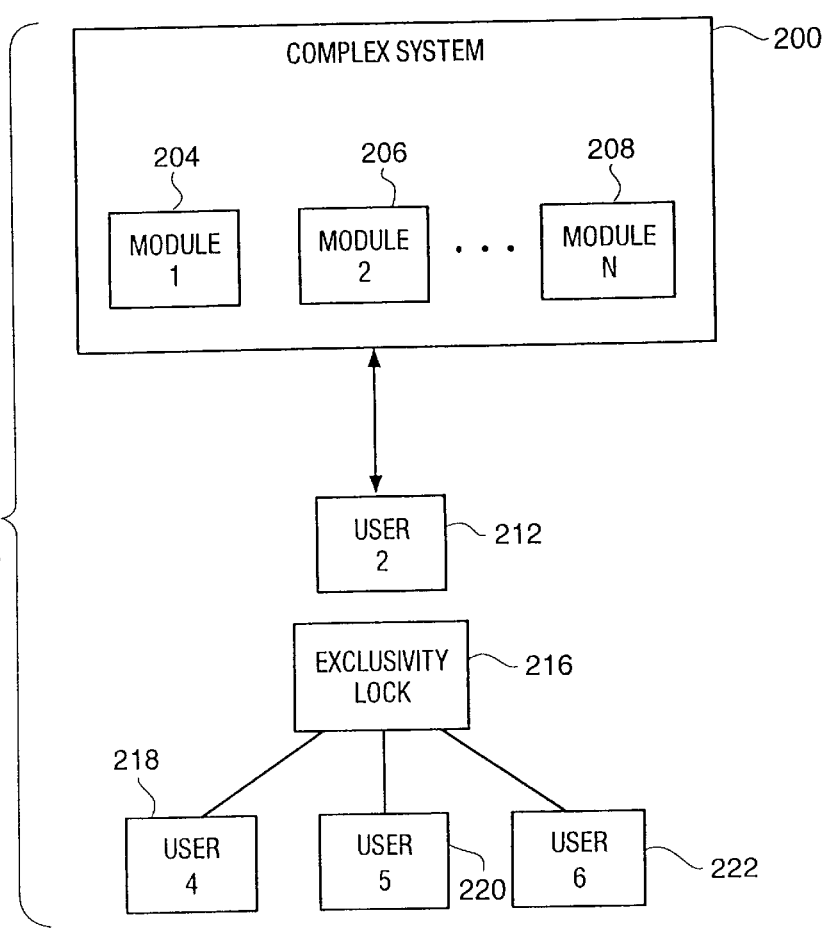
Figure 4:
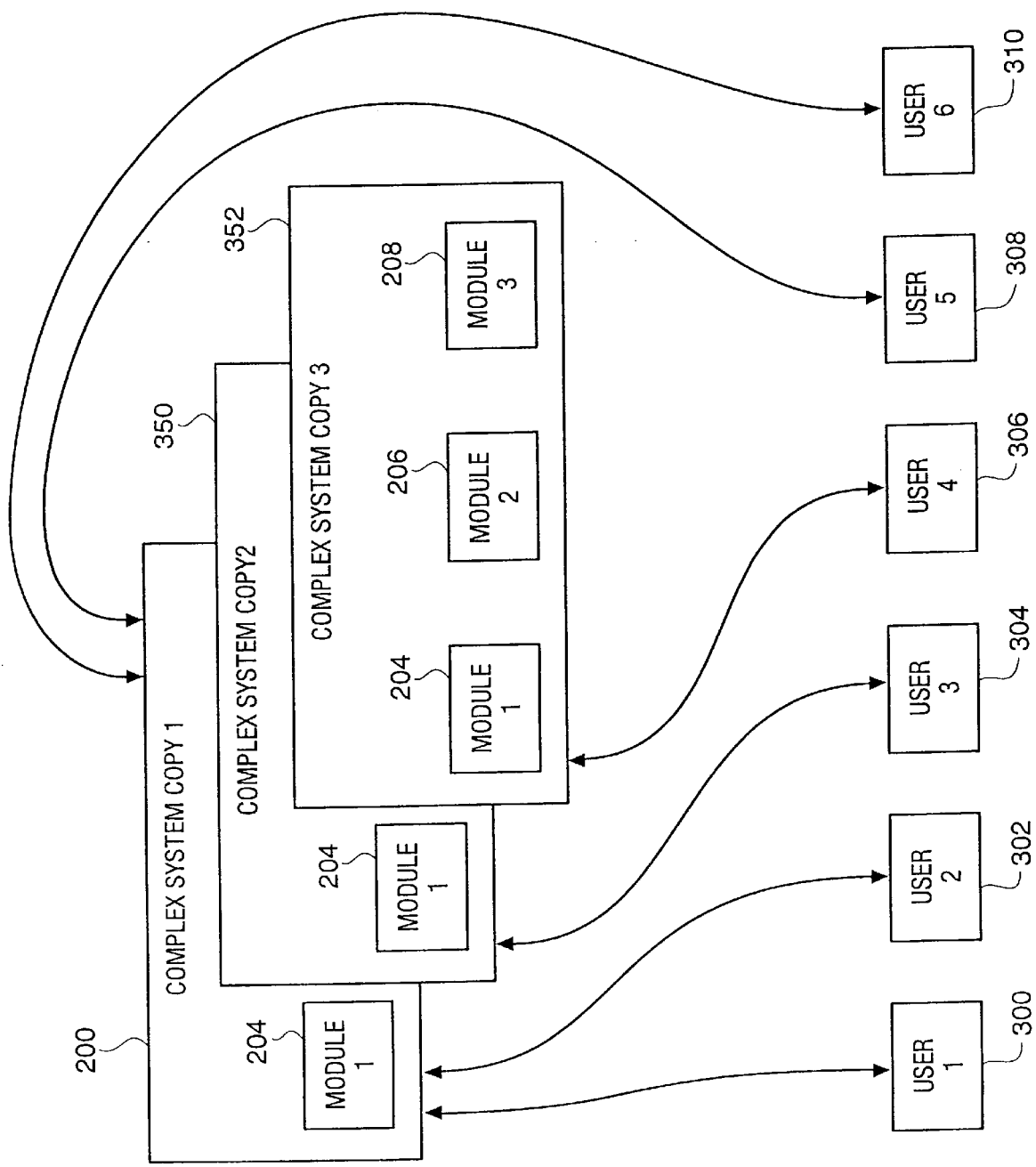

Existing Techniques For Managing Complex Software Systems—FIGS. 2–4

FIGS. 2 and 3 illustrate one technique in block diagram form for managing complex systems and coordinating the read/write activities of multiple users. Standard locking mechanisms provided by an operating system including semaphores and mutex, are used in FIGS. 2 and 3 to assure exclusive access to the complex system 200 so that conflicts never occur when changes are made to the system by more than one user. FIG. 2 illustrates users 210 and 214 sharing non-exclusive concurrent read-only access to the complex system 200. Complex system 200 includes a plurality of modules 204, 206, and 208. Another user 212 that requires write/modify access to the complex system 200 is blocked or suspended by exclusivity lock 216 and must wait for other users to relinquish access so that user 212 can have exclusive access to the complex system 200.

FIG. 3 illustrates the access scenario after user 212 has obtained exclusive access to the complex system 200. User 212, having obtained exclusive access to the complex system 200, forces subsequent users 218, 220, and 222 to block or suspend at exclusivity lock 212 to await availability of their respective required access.

The solution to the problem of maintaining a consistent view of the complex system 200 illustrated in FIGS. 2 and 3, is to force multiple users to work seriatim. This solution is undesirable because it reduces the overall performance of a computing environment by reducing the opportunity for concurrent processing by multiple users.

FIG. 4 illustrates another technique in block diagram form for maintaining a consistent view of a complex system 200.

Complex system 200 includes a plurality of modules 204, (206, and 208). A copy of the entire complex system 200 is created as 350 and 352 for each user 304 and 206 that requires exclusive write/modify access. Other users 300, 302, 308, and 310 requiring only read access to the complex system 200 share access to a single copy of the complex system 200.

FIG. 4 can include several variations. For example, the additional read only users 308 and 310 may share a new copy of the complex system that integrates the most recent changes generated by users 304 or 306. If the recent changes are not required or presently in an inconsistent state, read only processes 308 and 310 may simply share the read only access of the original complex system 200 with processes 300 and 302 as shown. However, this solution imposes significant overhead processing and storage costs and complexities on the computing system. Creating multiple copies of the entire complex system 200 requires significant amounts of processing time. Further, a copy of a large complex system 200 demands a significant storage capacity regardless if any changes are made by the process having exclusive access privileges. The extra processing and storage overhead discussed above can add significant costs to the computing system on which the processes operate.

Figure 5A:
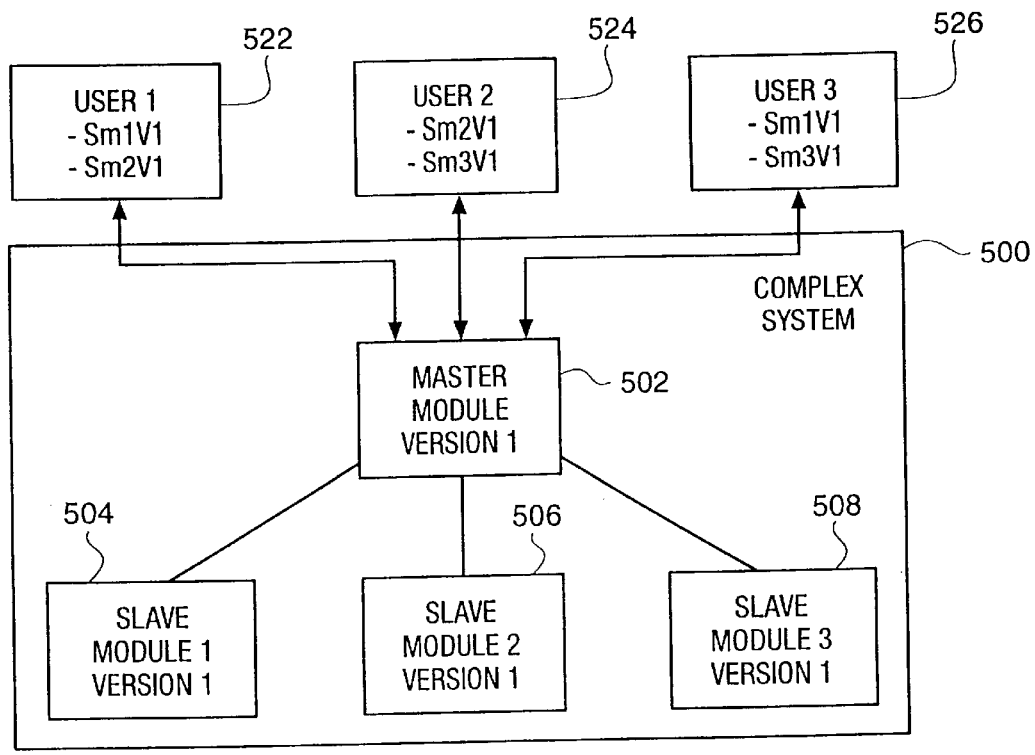
FIGS. 5a–5c illustrate an overview of the dynamic versioning system of the present invention in block diagram form.
Figure 5B:
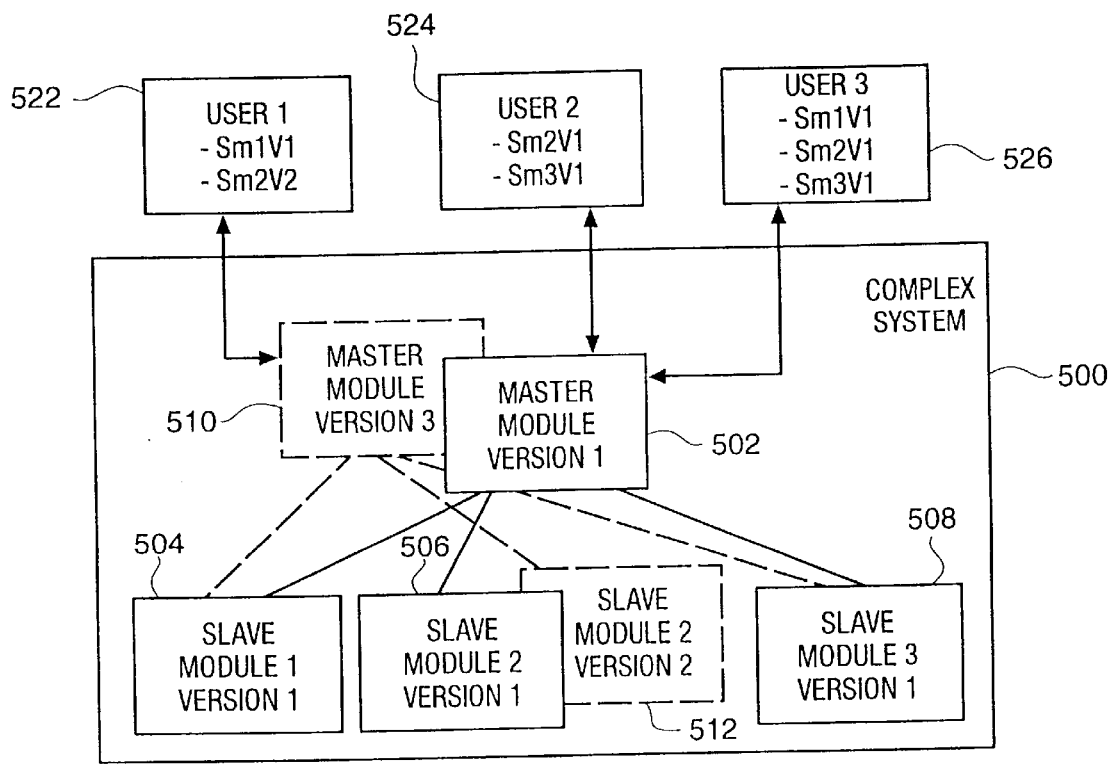

Dynamic Versioning Example—FIGS. 5a–5b

FIGS. 5a–5b illustrate an example of the dynamic versioning system in block diagram form. FIG. 5a illustrates a simplified example of a complex system 500 comprised of a master module 502 and a plurality of slave modules 504, 506, and 508. To simplify the example and to highlight the fundamental aspect of version number incrementing for dynamic versioning discussed below, the master module and each slave module in complex system 500 are each illustrated as a first version respectively.

A user that requests access to complex system 500 results in master module 502 being opened. Opening a master module means that the highest version of master module for complex system 500 is copied to the requesting user's private memory space. The master module in a given user's private memory space defines the "virtual version" of complex system 500 known to that user. Note that the "version" or virtual version of complex system 500 known to a user never changes for that user regardless of the existence of newer slave module versions created by other users. Note also that although the highest master module version available is opened and each user has read-only access to a single shared copy of each slave module identified in the master module, no individual slave modules are opened or copied to the user's private memory space unless expressly requested by the user or on behalf of the user. The user requesting a copy of a slave module incurs the processing and memory costs of copying the requested slave module to the desired user memory location at the time the copy is requested. Users requiring only read-only access to the shared copies of the slave modules incur no processing or memory overhead.

FIG. 5a also illustrates that subsequent to each user 522, 524, and 526 requesting read-only access to complex system 500 and opening master module 502, that User1 522 has requested and received a copy of slave module1 version1 (sm1v1) 504 and slave module2 version1 (sm2v1) 506 in its private memory space. Similarly, User2 526 has requested and received a copy of slave module2 version1 (sm2v1) 506 and slave module3 version1 (sm3v1) 508, and User 3 has requested and received a copy of slave module1 version1 (sm1v1) 504 and slave module3 version1 (sm3v1) 508 in their respective private memory spaces. Any modifications made to a copied one of the above identified slave modules is known only by the modifying user. No user sees the private modifications of a peer user having access to the same version of slave module because the private modifications of one user are by definition inconsistent with the complex system 500 known to the peer users working from the same generation of master module 502. Even if, for example, User1 522 actually saves a copy of a modified sm2v1 506 to the permanent non-volatile memory space for complex system 500, no other user 524 or 526 will see the modified copy because the modifications to sm2v1 506 are by definition inconsistent with the complex system 500 known to Users 524 and 526.

FIG. 5b illustrates the result of User1 522 having saved a modified copy of slave module sm2v1 506 to the permanent non-volatile memory space of complex system 500. By User1 requesting that its private copy of sm2v1 506 be saved in the permanent non-volatile memory space containing complex system 500, a new version2 of slave module2 (sm2v2) 512 is permanently created for complex system 500, and the new slave module sm2v2 512 coexists with but is independent of sm2v1 506. Note that each new version number assigned to any module is always monotonically increased from the last most recently used version number. Thus, once the new sm2v2 is permanently saved and recorded in the DVT, a new master module 510 is created and recorded in the DVT with a version number 3. The new mmv3 defines a version of the complex system 500 consisting of sm1v1 504, sm2v2 512, and sm3v1 508. The original master module mmv1 502 remains independently in existence and defines a version of complex system 500 that consists of sm1v1 504, sm2v1 506, and sm3v1 508. Note that now when User3 526 requests a read/write copy of slave module2, User3 526 receives a copy of sm2v1 because that is the slave module version known to mmv1 502 at the time User3 526 opened mmv1 502.

Figure 5C:
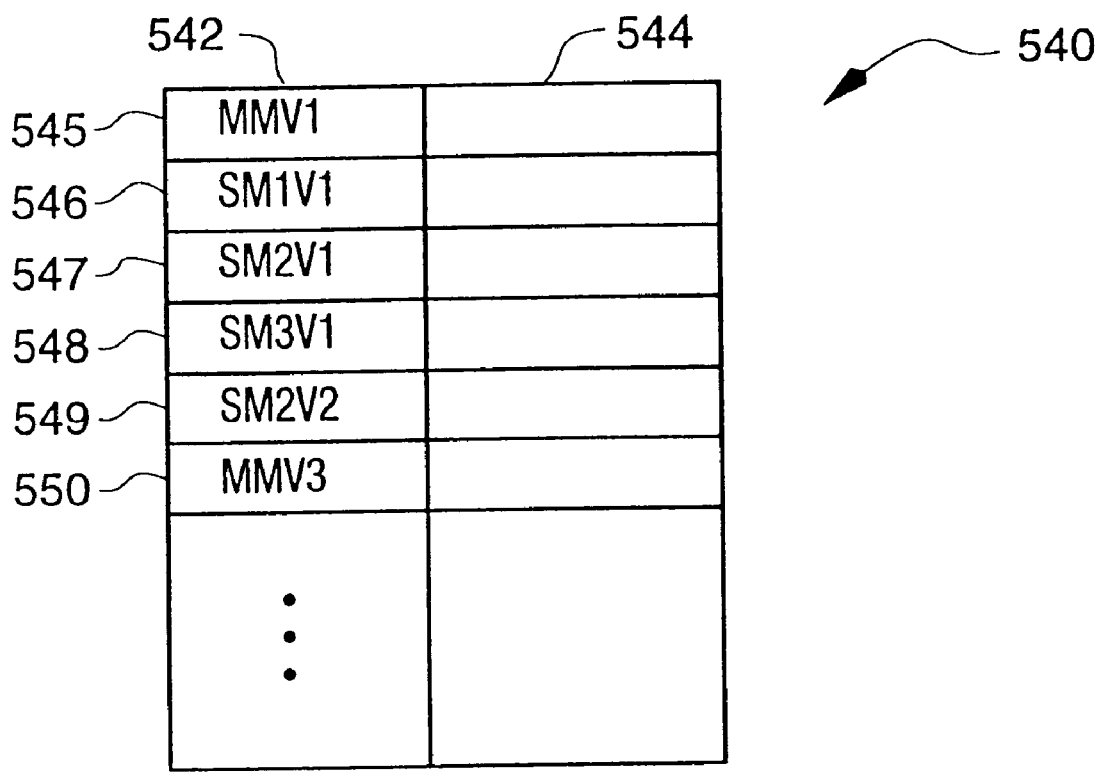

Dynamic Versioning Table—FIG. 5c

FIG. 5c illustrates the DVT 540 with record entries 545–550 corresponding to the evolution of complex system 500 illustrated in FIGS. 5a–5b. In one embodiment, each record 545–550 includes a module name and version number in column 542 and a unique module content/location column 544. An example of a module name and version number combination in column 542 could be "sm1v2" for slave module2 version1 as in record 547. The unique module content/location column 544 can include, but is not limited to, a Globally Unique IDentifier (GUID) for a module, a pointer to a module, a unique address or memory location for a module, the module itself, or any other mechanism useful to locate or contain the appropriate module.

When DVT 540 is first created or generated, the record entries in the DVT reflect only the first versions of each slave module and master module existing for complex system 500. In FIG. 5c, records 545–548 are initially generated to identify mmv1, sm1v1, sm2v1, and sm3v1 respectively. Subsequently, when a modified copy of sm2v1 is saved in the permanent non-volatile memory space for complex system 500, the DVT 540 is updated with a new record entry sm2v2 549 reflecting a monotonically incremented version number 2 based on the last most recent version number 1. Similarly, a new DVT record entry 550 is generated for master module version 3 550 generated in response to the saving of sm2v2 described above. The version number is monotonically increased again to version3 based on the last most recent version number 2. Alternatively, several modified slave modules can be simultaneously saved in permanent non-volatile memory by a single user and one new corresponding master module would be generated with the next higher version number.

Several alternatives exist to the monotonically increasing version identifier. The preferred embodiment of the version identifier is a numeric integer although a version identifier could also be either alphabetic, alphanumeric, or other symbol system, or any combination of numeric, alphabetic, alphanumeric, or other symbol system. Further, the version identifier can be organized as a decreasing identification sequence rather than an increasing sequence, and gaps may exist in either sequence provided the sequence is always increasing or decreasing. Any other version identification scheme can be used with the present invention provided the order and/or grouping of slave module versions and corresponding master module is preserved.

Figure 6:
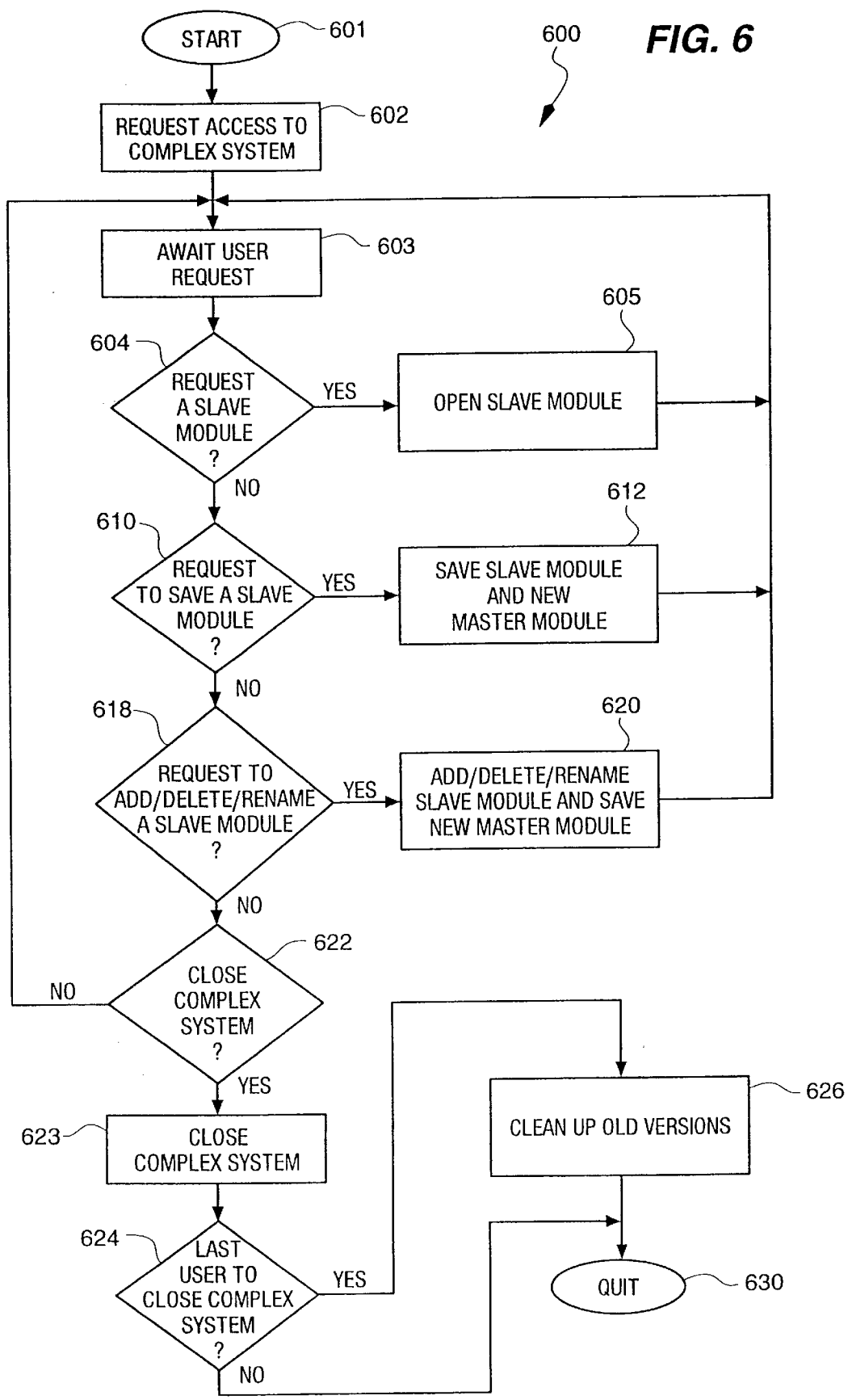
FIG. 6 illustrates an overview of operational steps for the dynamic versioning system in flow diagram form.

Dynamic Versioning Operational Overview—FIG. 6

FIG. 6 illustrates an overview of the operational steps for the dynamic versioning system 600 in flow diagram form. Details of various steps in the FIG. 6 overview are disclosed in the text accompanying FIGS. 7–12.

The dynamic versioning system 600 starts at step 601 and proceeds to open the most recent master module for a complex system at step 602 when a user requests access to the complex system. Details of step 602 are disclosed in the text accompanying FIG. 7. Once a master module is open and the user has read-only access to the slave module versions associated with that master module, the dynamic versioning system 600 awaits a specific request from the user at step 603 before taking any further action on the user's behalf. When a further user request is made by a user already having access to the complex system, the dynamic versioning system 600 determines what action is requested in a series of decision steps 604, 610, 618, and 622 and the appropriate action for each respective decision step is taken at steps 605, 612, or 620.

If a user requests that a slave module be opened, the request is identified at decision step 604 and the requested slave module is opened at step 605. Once the requested slave module is opened at step 605, processing continues at step 603 where the dynamic versioning system waits for another user request. Details of step 605 are disclosed in the text accompanying FIG. 8. If the user is not requesting that a slave module be opened at decision step 604, then processing continues to decision step 610.

If the user requests that a slave module be saved, the request is identified at decision step 610 and the requested slave module is saved in permanent non-volatile memory for the complex system at step 612. Once the requested slave module is saved at step 612, processing continues at step 603 where the dynamic versioning system waits for another user request. Details of the step 612 simple save are disclosed in the text accompanying FIGS. 9 and 10. The text accompanying FIG. 9 also discloses alternative save procedures including, but not limited to, simultaneously saving multiple modules by a single user. The text accompanying FIG. 10 discloses the more complex save with merge steps where at least two users are saving different slave modules to the same master module generation. In a final alternative where more than one user saves the same version of slave module, the dynamic versioning system can either perform a line by line comparison of the conflicting slave modules to reconcile any intra-module conflicts with or without human intervention, or the dynamic versioning system can simply let the last user saving the subject slave module overwrite all changes to that slave module previously saved by other users. If the user is not requesting that a slave module be saved at decision step 610, then processing continues at decision step 614.

If the user requests that a new slave module be added or an existing open slave module be deleted or renamed, the request is identified at decision step 618 and the add, delete, or rename action processed at step 620. Once the requested action is complete at step 620, processing continues at step 603 where the dynamic versioning system waits for another user request. Details of step 618 are discussed in the text accompanying FIG. 11. If the user is not requesting that a slave module be added, deleted, or renamed at decision step 618, then processing continues at decision step 622.

If the user no longer requires access to the complex system and requests that the opened master module and all slave modules for the complex system version be closed, the request is identified at decision step 622 and processing continues to close the modules at step 623. At decision step 624, the dynamic versioning system 600 determines if the requesting user is the last user to close the complex system. If at decision step 624 the requesting user is the last to close the complex system, then old versions of master and slave modules are removed from the permanent non-volatile memory space of the complex system at step 626. Details of step 626 are disclosed in the text accompanying FIG. 12. If at decision step 624 the requesting user is not the last to close the complex system, or if old version cleanup is complete at step 626, then processing is complete at step 630.

Accessing A Complex System—FIG. 7

FIG. 7 illustrates the steps in flow diagram form for opening a master module, also known as accessing a complex system. The steps in FIG. 7 are the details of step 602 in FIG. 6. When a user requests access to a complex system at step 700, the dynamic versioning system locates the master module in the DVT 540 having the highest version number. Locating the master module in the DVT 540 having the highest version number includes, but is not limited to, searching the key field in each record of the DVT 540 until the highest version number for a master module is found. Any keyed lookup or indexing technique can be used to search DVT 540. When the appropriate record is located, the dynamic versioning system saves the version number of the master module and opens the master module using the address in the module content/location field in DVT column 544 of the record located. Opening the master module includes, but is not limited to, generating a copy of the master module for the user's private memory space at step 702 and allowing the requesting user read-only access to all slave modules associated with the master module at step 704. Only one read-only copy of each slave module version exists and each user having read-only access to a given slave module shares a copy of the slave module. No slave module is opened and copied to a user's private memory space until an express request is received from the user or on behalf of the user. The slave modules associated with the opened master module are those having the highest version number less than the master module.

Opening A Slave Module—FIG. 8

FIG. 8 illustrates the steps in flow diagram form for opening a slave module. The steps in FIG. 8 are the details of step 605 in FIG. 6. When a user wishes to modify a slave module the user must expressly request that the slave module be opened. Opening a slave module includes, but is not limited to, locating the slave module's record in the DVT 540 at step 800, retrieving the slave module or its address from the module content/location field in the located DVT record at step 802, and generating a copy of the slave module for the user's private memory space at step 804. The user can modify the private copy of the requested slave module within the user's private memory space without affecting other users having shared read-only access to the "official" version of the slave module maintained by the dynamic versioning system.

Figure 9:
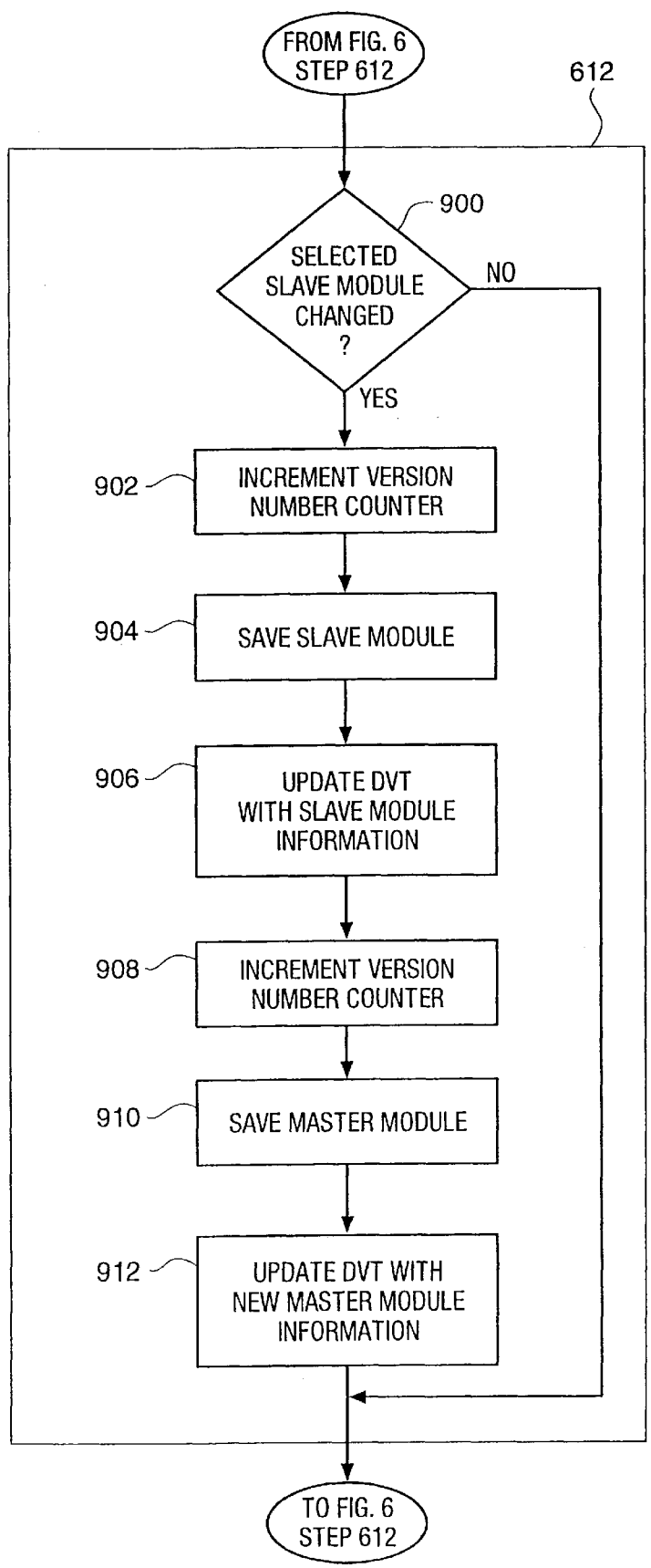
FIG. 9 illustrates an overview of operational steps in flow diagram form for saving a slave module in permanent non-volatile memory.

Permanently Saving A Slave Module—FIG. 9

FIG. 9 illustrates the steps in flow diagram form for permanently saving a slave module in the non-volatile memory space of the complex system. The steps in FIG. 9 are the details of step 612 in FIG. 6. Using the reference numbers from FIGS. 5b–5c, if the slave module 512 being saved is determined at decision step 900 not to have been modified, then processing in FIG. 9 is complete because the slave module does not need to be saved at all. If the slave module being saved 512 is determined at decision step 900 to have been modified, then processing continues at step 902 where the version number counter is monotonically incremented. At step 904, a copy of the modified slave module 512 is made from the user's private memory space to the complex system's permanent non-volatile memory space and the newly incremented version number is assigned to the modified slave module 512. At step 906 the DVT 540 is updated with a new record 549 identifying the new slave module version (sm2v2). Note that the modified slave module 512 exists along with the previous version slave module 506, although the only users that will know of slave module 512 include the user1 522 who saved the slave module and any new user who requests access to the complex system after slave module 512 has been saved.

The global version number counter is monotonically incremented again at step 908, and a new master module 510 is generated and identified at step 910 with the newly incremented version number (mmv3). At step 912 the DVT 540 is updated with a new record 550 identifying the new master module 510. The new master module 510 exists along with the previous master module 502, although both master modules are associated with different slave module versions. Key to the invention is that when monotonically increasing a version number, the master module always has higher version number than any of its slave modules.

In one alternative embodiment, the FIG. 9 steps for saving one slave module can be repeated as many times as necessary for a single user to save more than one modified slave module. Each saved slave module would be assigned its own unique incremented version number and a new master module would be generated to reflect the modified slave modules having been saved up to that point. The last new master module that is generated in the last iteration of the FIG. 9 steps would reflect all the modified slave modules saved by that single user.

In another alternative embodiment, the FIG. 9 steps for saving one slave module can be repeated as many times as necessary for a single user to save more than one modified slave module. Each saved slave module would be assigned the same incremented version number and only one new master module would be generated and identified with the next higher incremented version number and reflect all the newly saved slave modules.

Figure 10:
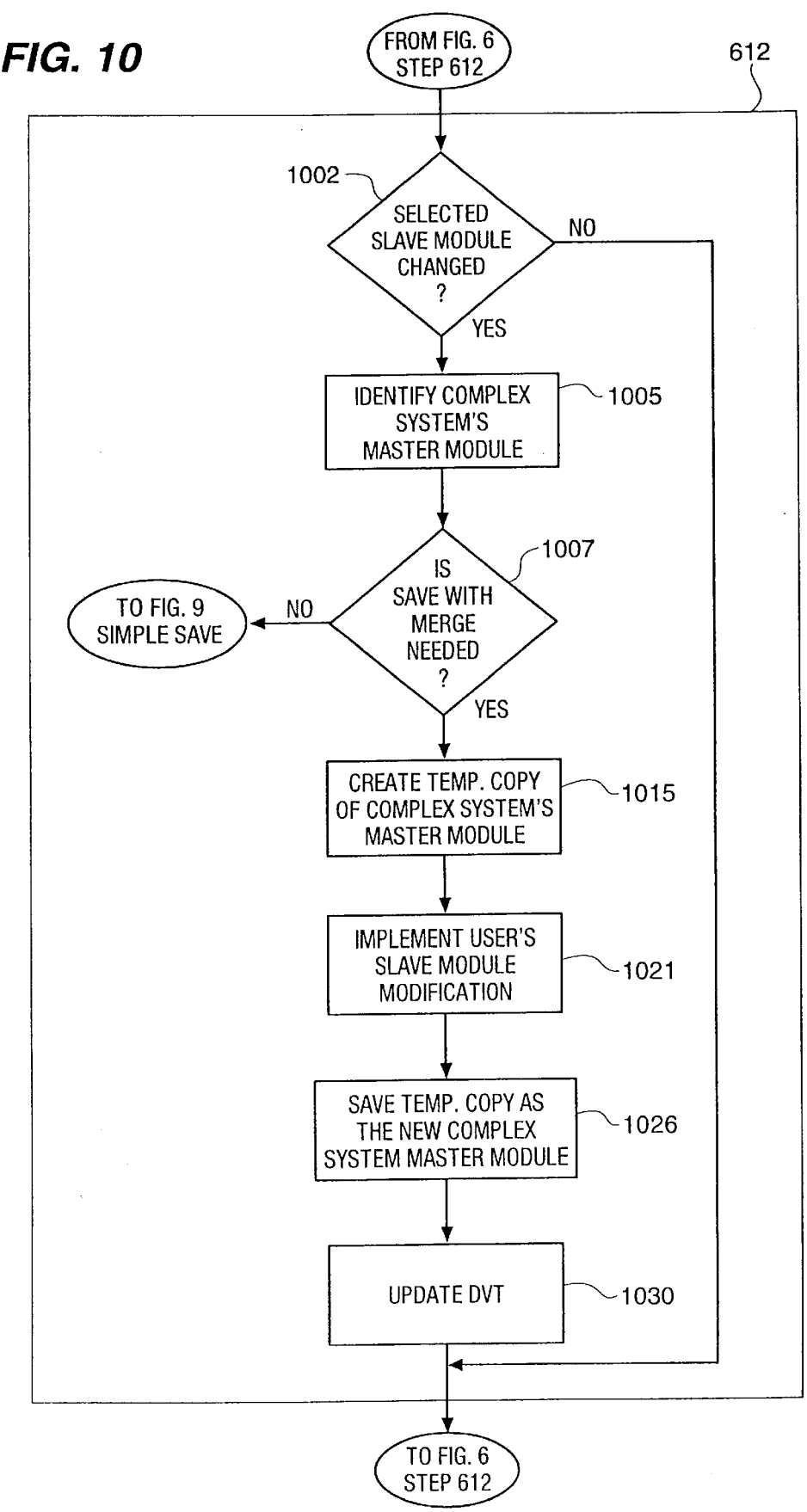
FIG. 10 illustrates an overview of operational steps in flow diagram form for saving and merging slave modules of the same master module generation from different users.

Saving With Merge—FIG. 10

FIG. 10 illustrates the more complex save with merge situation that may be necessary instead of or in combination with the simple save illustrated in FIG. 9. As with FIG. 9, the FIG. 10 steps are the details of step 612 of FIG. 6.

The simple saves discussed in the text accompanying FIG. 9 are adequate for situations where the master module has not been impacted. A master module is impacted when more than one user permanently saves a slave module originating from the same or different master module versions. For example, a save with merge is needed when user A and user B both open the same version of master module m, and user A permanently saves slave module X in master module version m+1, and user B permanently saves slave module Y in master module version m+2. A subsequent user C requesting read-only access to the complex system will receive a copy of master module version m+2 that does not contain user A's modifications to slave module X. Thus, to avoid this conflict between the saves of user A and user B, a save with merge is required as disclosed in FIG. 10 below instead of the simple save previously disclosed in FIG. 9.

If at decision step 1002 it is determined that the slave module being saved has not been modified, then no save is executed and processing returns to FIG. 6. Alternatively, if at decision step 1002 it is determined that the slave module being saved has been modified, then processing continues at step 1005.

The DVT 540 is searched at step 1005 to identify the master module in the complex system's permanent non-volatile memory having the highest version number. The master module having the highest version number in the DVT 540 is called the complex system's master module because the complex system's master module represents the most up-to-date set of slave modules for the complex system based on users having saved updated versions of individual slave modules over time, and it is the master module that would be opened for a new user who is requesting access to the complex system.

At decision step 1007, the threshold question is whether the present save request requires a simple save as in FIG. 9 or a save with merge as in FIG. 10. Thus, if at decision step 1007 it is determined that the user initiating the save has a master module version that is the same version as the complex system's master module, then processing can continue with the steps in FIG. 9 as previously described in the text accompanying FIG. 9. If at decision step 1007 it is determined that the user initiating the save has a master module version number that is lower than the complex system's master module version number, then processing continues with a save with merge at step 1011. Note that certain heuristic optimizations may be applied to decision step 1007 to reduce the occurrence of save with merge operations in favor of the simple save operations of FIG. 9. For example, a heuristic analysis of the detailed state of the user's master module and respective slave modules compared to the complex system's master module and respective slave modules, may reveal that no actual conflict exists among the slave modules so that a simple save can be used to avoid the more costly save with merge operation. Alternatively, heuristic analysis of the detailed state of the user's master module and respective slave modules compared to the complex system's master module and respective slave modules, may reveal that actual conflicts exist and that the user should be warned to save the slave module as a different name to avoid a conflict, or require that the user walk through conflicting saves to manually reconcile conflicts on a line-by-line basis.

In one preferred embodiment, the dynamic versioning system makes a temporary copy of the complex system's master module at step 1015. The user's slave module modification is implemented in the temporary copy of the complex system's master module at step 1021. Implementing the user's slave module modification may include, but is not limited to, replacing or renaming a slave module in the temporary copy of the complex system's master module with the user's slave module, adding the user's previously non-existing slave module to the temporary copy of the complex system's master module, or deleting a slave module from the temporary copy of the complex system's master module.

The updated temporary copy of the complex system's master module is assigned a new version number and the temporary copy is saved in the permanent non-volatile memory for the complex system at step 1026. The DVT 540 is updated at step 1030 to reflect the new master module version for the complex system and processing continues in FIG. 6 as previously discussed. The temporary master module is no longer needed and can be discarded from volatile memory. The user's master module is retained by the user until the user closes their version of the complex system.

Figure 11:
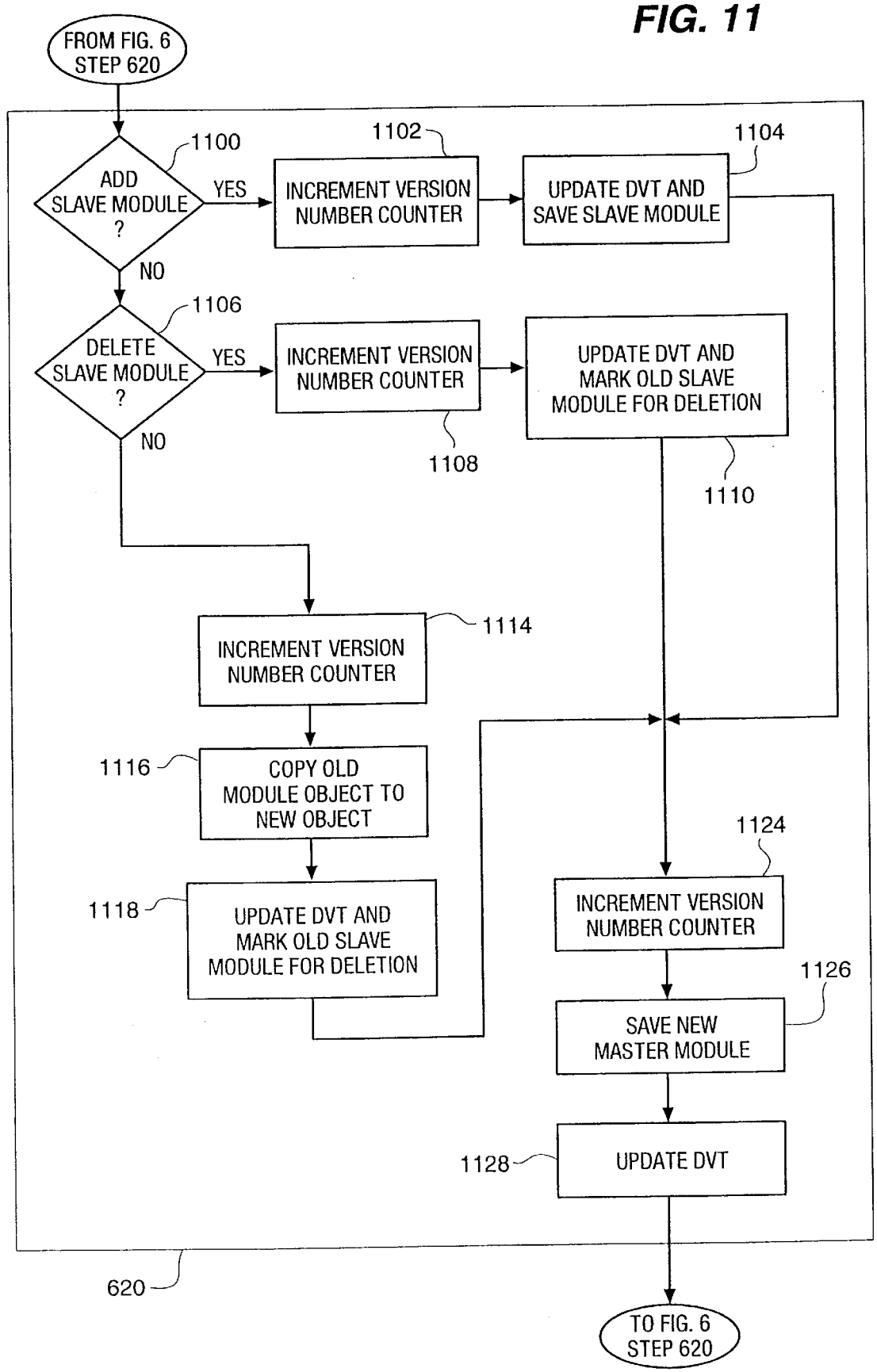
FIG. 11 illustrates an overview of operational steps in flow diagram form for adding, deleting, and renaming a slave module.

Add, Delete, Rename Slave Modules—FIG. 11

FIG. 11 illustrates steps in flow diagram form for adding a new slave module, or renaming or deleting a previously existing slave module. The steps in FIG. 11 are the details of step 620 in FIG. 6.

If at decision step 1100 it is determined that a new slave module is being saved, then the version number counter is incremented at step 1102 and a new record is added to the DVT 540 at step 1104 to reflect the new slave module name, new version number, and location identification. The new slave module is also saved at step 1104. The version number counter is incremented again at step 1124, a new master module is generated and given an incremented version number at step 1126, and a new record is added to the DVT 540 at step 1128 to reflect the master module name, new version number, and location identification. The new master module is also saved at step 1128. The new master module reflects the existence of all slave modules having the highest version numbers of their types including the newly added slave module with its newly assigned version number. If at decision step 1100 it is determined that a new slave module is not being saved, then processing continues at decision step 1106. If at decision step 1106 it is determined that an existing slave module is being deleted, then the version number counter is incremented at step 1108 and a new record is added to the DVT 540 at step 1110 to reflect the slave module name, new version number, location identification, and flag indicating that the salve module is deleted. The version number counter is incremented again at step 1124, a new master module is generated and identified by the incremented version number at step 1126, and a new record is added to the DVT 540 at step 1128 to reflect the master module name, new version number, and location identification. The new master module reflects the existence of all slave modules having the highest version numbers of their types absent the deleted slave module.

If at decision step 1106 it is determined that an existing slave module is not being added or deleted, then processing continues at step 1114. Renaming an existing slave module begins at step 1114 by incrementing the version number counter. A copy of the slave module being renamed is generated at step 1116 and a record is added to the DVT 540 at step 1118 to reflect the new slave module name, the new version number, and location identification for the copy of the slave module being renamed. The DVT 540 is also updated at step 1118 to mark the old slave module for deletion in the respective DVT 540 record. The version number counter is incremented again at step 1124, a new master module is generated and identified by the incremented version number at step 1126, and a new record is added to the DVT 540 at step 1128 to reflect the new master module name, new version number, and new master module location identification. The new master module reflects the existence of all slave modules having the highest version numbers of their types including the new renamed slave module but absent the old deleted slave module. In alternative embodiments, a slave module could be renamed by replacing the slave module name in the DVT 540, or by adding a new name and redirecting module pointers for the old module name entry until the old entry is deleted at cleanup time.

Figure 12:
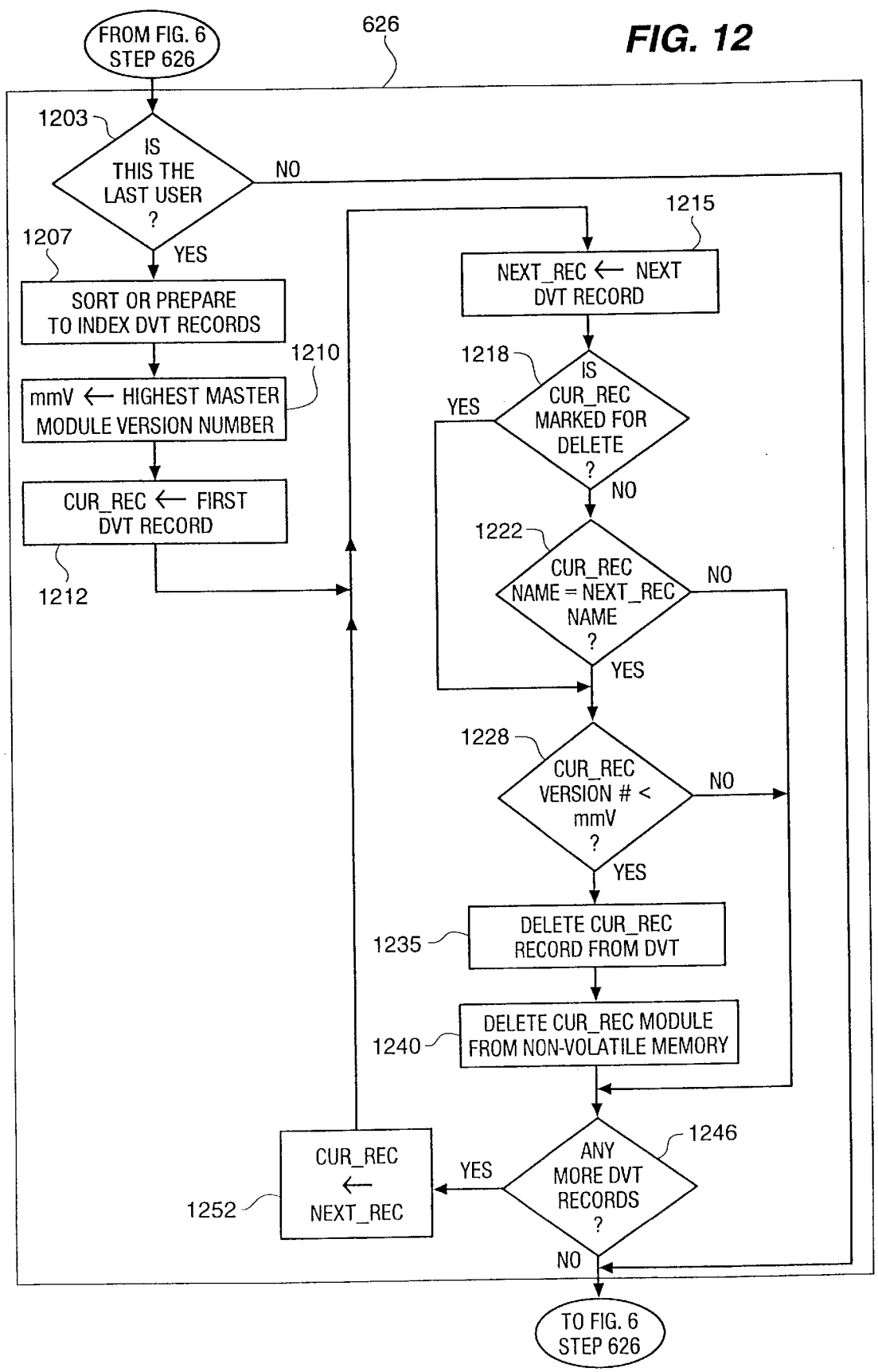
FIG. 12 illustrates an overview of operational steps in flow diagram form for cleaning up complex system versions following the last user to relinquish control of the complex system.

Last User Cleanup—FIG. 12

FIG. 12 illustrates steps in flow diagram form for cleaning up old versions of the complex system following the last user to relinquish access to the complex system. The FIG. 12 steps are the details of step 626 in FIG. 6. Cleanup after the last user has relinquished access to the complex system is significant because previous users having access to the complex system will have left behind old versions of slave modules and master modules that can be removed from the complex system's non-volatile memory space. Only the highest versions of slave modules and one corresponding master module should remain in the DVT 540 and in permanent non-volatile memory following cleanup from the last user to relinquished access to the complex system. Note that the last user cleanup process is designed to run even if a new user requests access to the complex system prior to the cleanup process being complete. Further, the cleanup process can run during idle time or at complex system startup time, however, one preferred embodiment runs the cleanup process at the time the last user relinquishes control of the complex system because this is the time users are least likely to object to any performance impact due to cleanup processing overhead.

The cleanup process begins at decision step 1203 by determining if the user relinquishing control of the complex system is the last user. If it is determined at decision step 1203 that this user is not the last user, then processing continues at FIG. 6 step 626 and the cleanup process is not performed. If it is determined at decision step 1203 that this user is the last user, then processing continues at step 1207 where the records in the DVT 540 are sorted in ascending order by version number within module name. Alternatively, rather than physically sorting DVT 540 records, the DVT 540 records can be accessed during the FIG. 12 processing steps disclosed below by any indexed traversal scheme that identifies DVT 540 records in ascending order by version number within module name without physically rearranging the DVT 540 records.

At step 1210 the master module in DVT 540 having the highest version number is identified and the version number saved in mmV. At step 1212, the first record of the sorted DVT 540 is saved as the current record CUR_REC, and at step 1215 the next record of the sorted DVT 540 is saved as the next record NEXT_REC.

If at decision step 1218 CUR_REC is marked for deletion, then processing continues at decision step 1228 where it is determined if the version number of CUR_REC is less than mmV. Alternatively, if CUR_REC is not marked for deletion at decision step 1218, then processing continues at decision step 1222.

If at decision step 1222 the CUR_REC module name is the same as the NEXT_REC module name, then processing continues at 1228 where the version number of CUR_REC is tested to see if the CUR_REC version number is less than mmV. If the CUR_REC version number is less than mmV then the CUR_REC record is deleted from the DVT 540 at step 1235 and the CUR_REC module is deleted from non-volatile memory at step 1240. Processing then continues at decision step 1246. Alternatively, if at decision step 1222 the CUR_REC module name is not equal to the NEXT_REC module name, or the CUR_REC version number is not less than mmV, then processing continues at decision step 1246. One reason why decision step 1228 distinguishes between CUR_REC versions that are less than mmV and CUR_REC versions that are not less than mmV, is because the FIG. 12 cleanup processing can proceed while a new user might request complex system access and permanently save a slave module, thereby generating DVT 540 record entries having version numbers greater than mmV. The FIG. 12 cleanup processing in the preferred embodiment deals only with module versions that existed at the time the last user relinquished control of the complex system and the highest version master module at that time is mmV. Thus, any module version not less than mmV is ignored until the next time cleanup processing is invoked.

If at decision step 1246 there are more records to evaluate in DVT 540, then processing continues at step 1252 where CUR_REC is set to NEXT_REC and processing continues at step 1215 as previously disclosed. If at decision step 1246 there are no more records to evaluate in DVT 540, then processing continues after step 626 in FIG. 6 as previously disclosed.

SUMMARY

The dynamic versioning system synchronizes different versions of a multiple module software system for use by multiple users, and maintains a consistent view of a given version of the software system for each user having access to a version of the system. Although specific embodiments are disclosed for example herein, it is expected that persons skilled in the art can and will design alternative dynamic versioning systems that are within the scope of the following claims either literally or under the Doctrine of Equivalents.

What is claimed is:

1. A method for automatically managing versions of software within a complex system that initially is comprised of a first master version including a plurality of modules, the method comprising:

providing a plurality of users with access to the plurality of modules of the first master version;

permitting a user to access and modify a private copy of a module of the first master version, without affecting other private copies of the module in use by the plurality of users;

creating a second master version, whenever the user modifies and saves the private copy of the module to create a new version, including the new version of the module and any of the plurality of modules associated with the first master version that have not been saved; and restricting access to the second master version to the user that created the new version of the module and new users, while providing all other users with access to the first master version.

2. The method of claim 1 wherein modifying the module in the first master version to generate the second master version further comprises:

providing the user with read-only access to the module;

receiving a request to modify the module from the user;

transferring the module to a memory space for the user;

permitting the user to modify the module in the memory space for the user;

receiving the modified module from the user;

creating a new master version in response to receiving the modified module, wherein the new master version is the second master version; and storing information associating the modified module and any unmodified modules with the second master version.

3. The method of claim 2 wherein the user shares read-only access with the plurality of users of the module until receiving the module into the memory space for the user.

4. The method of claim 3 further comprising maintaining a table that associates the modified and unmodified modules with a respective master version.

5. The method of claim 1 wherein providing access to the module in the first master version to the user further comprises providing access to a master version currently being accessed by the user.

6. The method of claim 1 wherein providing access to the modified module in the second master version to the user further comprises providing access to a master version that is the most current.

7. The method of claim 1 further comprising merging the modified module with a master version that is the most current if the second master version is not the master version that is the most current.

8. The method of claim 1 further comprising updating the complex system's software, after access to the software is ended, and storing a master version that is the most current and includes a version of all of the modules that is the most current.

9. The method of claim 1 further comprising assigning a unique increment version number to each of the plurality of modules that is modified and saved, and generating a new master revision, after each of the plurality of modules has been modified and saved.

10. The method of claim 1 further comprising assigning an increment version number that is the same to each of the plurality of modules that is modified and saved, and generating a new master revision that includes each of the plurality of modules that have been modified and saved.

11. The method of claim 1 further comprising conducting a comparison between a master version that the user is attempting to save and a second master version that is stored by the complex system, and determining whether the master version can be save as a new master version or whether the master version should be merged with other existing master versions and saved as the new master version.

12. The method of claim 11 further comprising determining if a conflict exist between the master version and the second master version, and warning the user to save conflicting modules under different names or instructing the user to execute conflicting saves to reconcile the conflicts.

13. The method of claim 1 further comprising making a temporary copy of a master version that is stored by the complex system and implementing any modifications by deleting, adding, or renaming the module in the temporary copy of the master version, and storing an updated version of the temporary copy of the master version as the master version stored by the complex system.

14. A computer-readable medium having computer-executable instructions for managing software initially comprised of a first master version including a plurality of modules by performing the steps comprising:

providing a plurality of users with access to the plurality of modules of the first master version;

permitting a user to access and modify a private copy of a module of the first master version, without affecting other private copies of the module in use by the plurality of users;

creating a second master version, whenever the user modifies and saves the private copy of the module to create a new version, including the new version of the module and any of the plurality of modules associated with the first master version that have not been saved; and restricting access to the second master version to the user that created the new version of the module and new users, while providing all other users of the plurality of users with access to the first master version.

15. The computer-readable medium of claim 14 wherein modifying the module in the first master version to generate the second master version further comprises:

providing the user with read-only access to the module;

receiving a request to modify the module from the user;

transferring the module to a memory space for the user;

permitting the user to modify the module in the memory space for the user;

receiving the modified module from the user;

creating a new master version in response to receiving the modified module, wherein the new master version is the second master version; and storing information associating the second master version with the modified module and any unmodified modules in the first master version.

16. The computer-readable medium of claim 15 wherein the user shares read-only access with the plurality of users of the module until receiving the module into the memory space for the user.

17. The computer-readable medium of claim 16 further comprising maintaining a table that associates the modified and unmodified modules with a respective master version.

18. The computer-readable medium of claim 14 wherein providing access to the module in the first master version to the user further comprises providing access to a master version currently being accessed by the user.

19. The computer-readable medium of claim 18 wherein providing access to the modified module in the second master version to the user further comprises providing access to a master version that is the most current.

20. The computer-readable medium of claim 14 further comprising merging the modified module with a master version that is the most current if the second master version is not the master version that is the most current.

21. The computer-readable medium of claim 14 further comprising updating the complex system's software, after access to the software is ended, and storing a master version that is the most current, and includes a version of all of the nodules that is the most current.

22. The computer-readable medium of claim 14 further comprising assigning a unique increment version number to each of the plurality of modules that is modified and saved, and generating a new master revision, after each of the plurality of modules has been modified and saved.

23. The computer-readable medium of claim 14 further comprising assigning an increment version number that is the same to each of the plurality of modules that is modified and saved, and generating a new master revision that includes each of the plurality of modules that have been modified and saved.

24. The computer-readable medium of claim 14 further comprising conducting a comparison between a master version that the user is attempting to save and a second master version that is stored by the complex system, and determining whether the master version can be save as a new master version or whether the master version should be merged with other existing master versions and saved as the new master version.

25. The computer-readable medium of claim 24 further comprising determining if a conflict exist between the master version and the second master version, and warning the user to save conflicting modules under different names or instructing the user to execute conflicting saves to reconcile the conflicts.

26. The computer-readable medium of claim 24 further comprising making a temporary copy of a master version that is stored by the complex system and implementing any modifications by deleting, adding, or renaming the module in the temporary copy of the master version, and storing an updated version of the temporary copy of the master version as the master version stored by the complex system.

* * * * *